(12) United States Patent
Boyd

(10) Patent No.: US 7,296,540 B2
(45) Date of Patent: Nov. 20, 2007

(54) INSULATED PROBE DEVICE

(75) Inventor: Randal D. Boyd, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 11/373,017

(22) Filed: Mar. 10, 2006

(65) Prior Publication Data

US 2007/0209602 A1  Sep. 13, 2007

(51) Int. Cl.
*A01K 15/04* (2006.01)
(52) U.S. Cl. .................. 119/720; 119/765; 119/859; 119/908; 119/719; 340/573.3; 472/56
(58) Field of Classification Search ............... 119/720, 119/765, 859, 908
See application file for complete search history.

(56) References Cited

U.S. PATENT DOCUMENTS

| 5,099,797 A | 3/1992 | Gonda |
| 5,193,484 A | 3/1993 | Gonda |
| 5,207,178 A | 5/1993 | McDade et al. |
| 5,471,954 A | 12/1995 | Gonda et al. |
| 5,601,054 A | 2/1997 | So |
| 5,787,841 A | 8/1998 | Titus et al. |
| 5,934,225 A | 8/1999 | Williams |
| 6,232,880 B1 | 5/2001 | Anderson |
| 6,750,758 B2 | 6/2004 | Duncan et al. |
| 6,827,043 B2 * | 12/2004 | Jameson et al. ............ 119/765 |

* cited by examiner

*Primary Examiner*—Michael J. Carone
*Assistant Examiner*—Willie Berry, Jr.
(74) *Attorney, Agent, or Firm*—Pitts & Brittian, PC

(57) ABSTRACT

Described is an insulated probe device of adjustable axial length for delivering an electroshock stimulus to an animal. The insulated probe device includes an electrode that is positioned in contact with the animal's skin and is disposed within an electrically non-conductive housing. The housing is a two-part housing, where the two parts cooperate such that the ultimate length of the housing is adjustable. The insulated probe devise includes a mounting device that electrically and mechanically secures the insulated probe device to an electronic animal training device. The mounting device is electrically connected to the electrode by way of a conductor, which is disposed within the housing. The conductor is a metal-rubber substance that conducts electricity like a metal and stretches like rubber such that it is capable of various lengths. Consequently, the ultimate length of the insulated probe device is adjustable.

15 Claims, 2 Drawing Sheets

INSULATED PROBE DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a device for delivering an electroshock stimulus to an animal for behavioral training and/or containment purposes. More particularly, this invention pertains to such a device which includes a conductor of adjustable axial length for minimizing electric shunting that commonly occurs when an electroshock stimulus is delivered to an animal with a moist coat.

2. Description of the Related Art

In the field of electronic animal training and/or containment devices, electrodes of opposing charge are placed proximate each other and held in contact with the skin of an animal being trained. Normally, the electrodes are carried on collars worn by the animal. These electrodes are connected to an electroshock stimulus generator. The electroshock stimulus generator is generally connected to a sensor capable of receiving information pertaining to the timing and type of electroshock stimulus that is to be delivered to the animal that is undergoing training. Transmission of the signal determining the appropriate time to deliver the electroshock stimulus and the type of electroshock stimulus to be delivered is usually achieved via either an automatic transmitter capable of detecting an undesirable behavior of the animal or via a manual transmitter controlled by the animal's instructor.

Conventional probe devices have previously been used in association with electronic animal training devices. These probe devices have generally consisted of solid, single-piece, electrically conductive electrodes that attach directly to the electronic animal training device and deliver the electroshock stimulus to the animal. Electrodes that are not insulated display greatly reduced effectiveness in conditions where the animal's coat has become wet. Other conventional probe devices used in conjunction with electronic animal training devices consist of the same solid, single-piece construction, but also utilize insulation over some parts of the electrode. This insulation serves to shield parts of the animal other than its skin from the probe. In this way, unwanted electrical shunting is reduced.

The size and build of the animal, and even the coat-type of the animal, dictate the desired length of the described insulated probe devices. The ultimate length of an insulated probe device determines the effectiveness and the safeness of the insulated probe device as much as the insulation itself. Certain insulated probe devices utilize expanding conductors, in connection with a housing of adjustable length, to provide an insulated probe device of adjustable length. These conventional devices typically utilize a coiled wire, a rigid multi-part telescoping conductor, or simply an excess of wire to accomplish an expanding conductor. These conventional devices are limited in that they require housings large enough to provide sufficient storage space for the space-consuming, expanding conductors.

BRIEF SUMMARY OF THE INVENTION

In accordance with various features of the present invention there is provided an insulated probe device of adjustable axial length for delivering an electroshock stimulus to an animal for behavioral training and/or containment purposes. The insulated probe device cooperates with a conventional electronic animal training device, which generates the electroshock stimulus, to deliver the electroshock stimulus to the animal carrying the electronic animal training device. The insulated probe device includes an electrode that is positioned in contact with the animal's skin and is disposed within an electrically non-conductive housing that insulates the electrode from moisture that accumulates on the animal's coat. The housing in one embodiment is a two-part housing, where the two parts cooperate such that the ultimate axial length of the housing is adjustable. The insulted probe device includes an electrically conductive mounting device that electrically and mechanically secures the insulated probe device to the electronic animal training device. The mounting device is electrically connected to the electrode by way of a conductor, which is disposed within the housing. The conductor is a metal-rubber substance that conducts electricity like a metal and stretches like rubber such that it is capable of various lengths. Consequently, the adjustable housing working cooperatively with the conductor provides the insulated probe device with an adjustable axial length.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
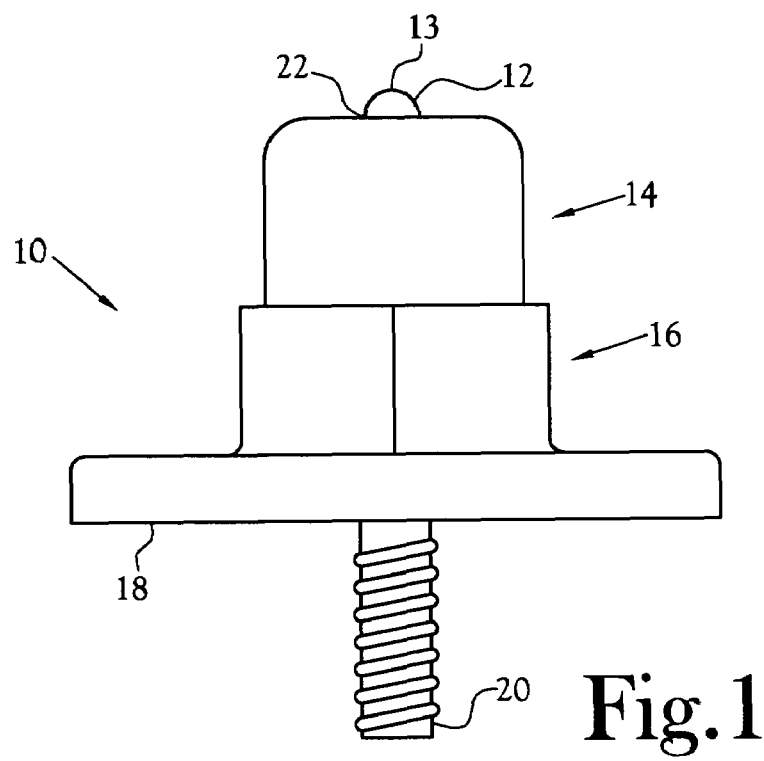
FIG. 1 is a side elevation view of an insulated probe device illustrating various features of the present invention.

One embodiment of an insulated probe device of adjustable axial length for delivering an electroshock stimulus to an animal for behavioral training and/or containment purposes and constructed in accordance with various features of the present invention is illustrated generally at 10 in FIG. 1. The insulated probe device 10 cooperates with a conventional electronic animal training device, which generates the electroshock stimulus, to deliver the electroshock stimulus to the animal carrying the electronic animal training, behavioral modification device. The insulated probe device 10 includes an electrode that is positioned in contact with the animal's skin and is disposed within an electrically non-conductive housing that insulates the electrode from moisture that accumulates on the animal's coat. The probe device is normally carried on a collar and maintained in contact with the animal's skin. The housing preferably is a two-part housing, where the two parts cooperate such that the ultimate axial length of the housing is adjustable. The insulted probe device 10 includes an electrically conductive mounting device that electrically and mechanically secures the insulated probe device to the electronic animal training device. The mounting device is electrically connected to the electrode by way of a conductor, which is disposed within the housing. The conductor is a metal-rubber substance that conducts electricity like a metal and stretches in a manner similar to rubber such that it is capable of conforming to various lengths. Consequently, an adjustable housing working cooperatively with the conductor provides the insulated probe device with an adjustable axial length.

Figure 2:
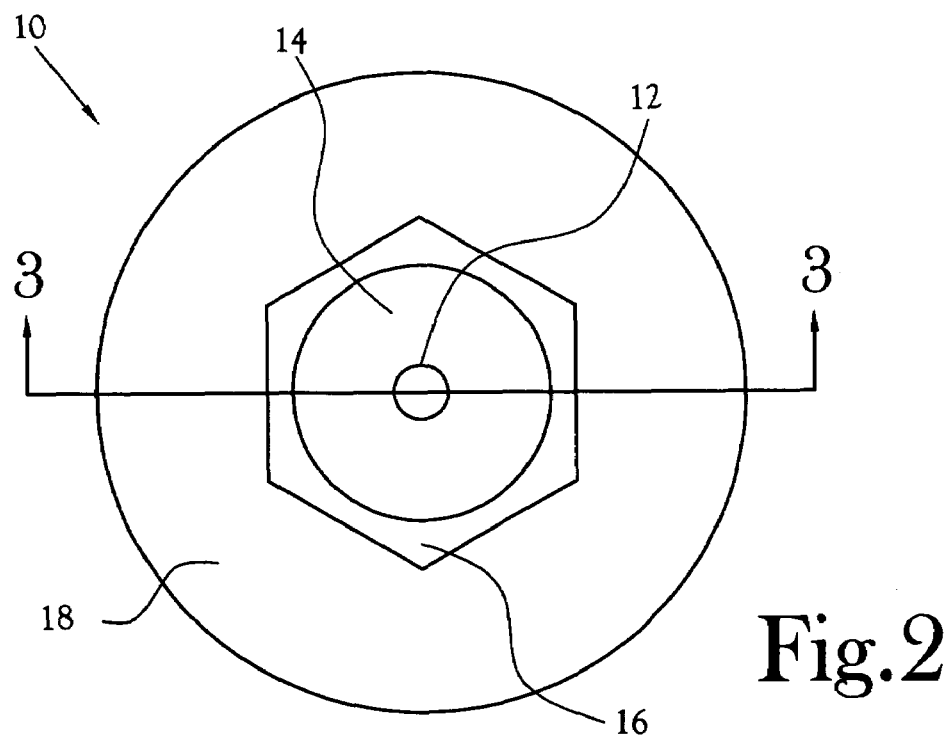
FIG. 2 is a top plan view of the insulated probe device of FIG. 1.

FIG. 1 illustrates a side elevation view of an insulated probe device 10 constructed in accordance with various features of the present invention. The insulated probe device 10 includes an electrode 12, a first housing component 14, a second housing component 16, a washer 18, and a mounting device 20. The electrode 12 is electrically conductive and defines a tip 13 which is preferably rounded to enhance the comfort of the animal. The electrode 12 is disposed within the first housing component 14, which is electrically insulating. In the illustrated embodiment, the first housing component 14 is a cylindrical cap that includes an opening 22 that is located at the center, uppermost part of the cap. The tip 13 of the electrode 12 extends from the first housing component 14 through the opening 22. The second housing component 16 is electrically insulating and is mechanically secured to the first housing component 14 and the mounting device 20. In the illustrated embodiment, the second housing component 16 is generally cylindrically shaped and provides a through-opening that runs axially through the second housing component 16. Additionally, the second housing component 16 defines the washer 18 where the second housing component 16 is secured to the mounting device 20. The outer surface of the second housing component 16 defines a hexagonal area, as illustrated in FIG. 2, adapted to cooperate with a standard wrench or socket driver. As illustrated in FIG. 1, the mounting device 20 is secured to the second housing component 16 such that the mounting device 20 extends from the second housing component 16 through the center of the washer 18 in the direction opposite of the electrode 12. The mounting device 20 is electrically conductive and mechanically secures and electrically connects the insulated probe device 10 to the electronic animal training device. In the illustrated embodiment, the mounting device 20 is a threaded stud that cooperates with a female threaded portion of the electronic animal training device.

Those skilled in the art will recognize that a housing configuration other than the configuration of the illustrated embodiment can be used without departing from scope or spirit of the present invention. Additionally, those skilled in the art will recognize that the mounting device 20 can be a structure other than a threaded stud, such as a snap fastener or multi-prong plug, without departing from the scope or spirit of the present invention.

To secure the insulated probe device 10 to the electronic animal training device, the mounting device 20 passes through an opening in the animal's collar (now shown) and is secured to the electronic animal training device such that both the insulated probe device 10 and the electronic animal training device are secured to the animal's collar. The enlarged section or washer 18 prevents the insulated probe device 10 from passing through the opening in the animal's collar.

Figure 3:
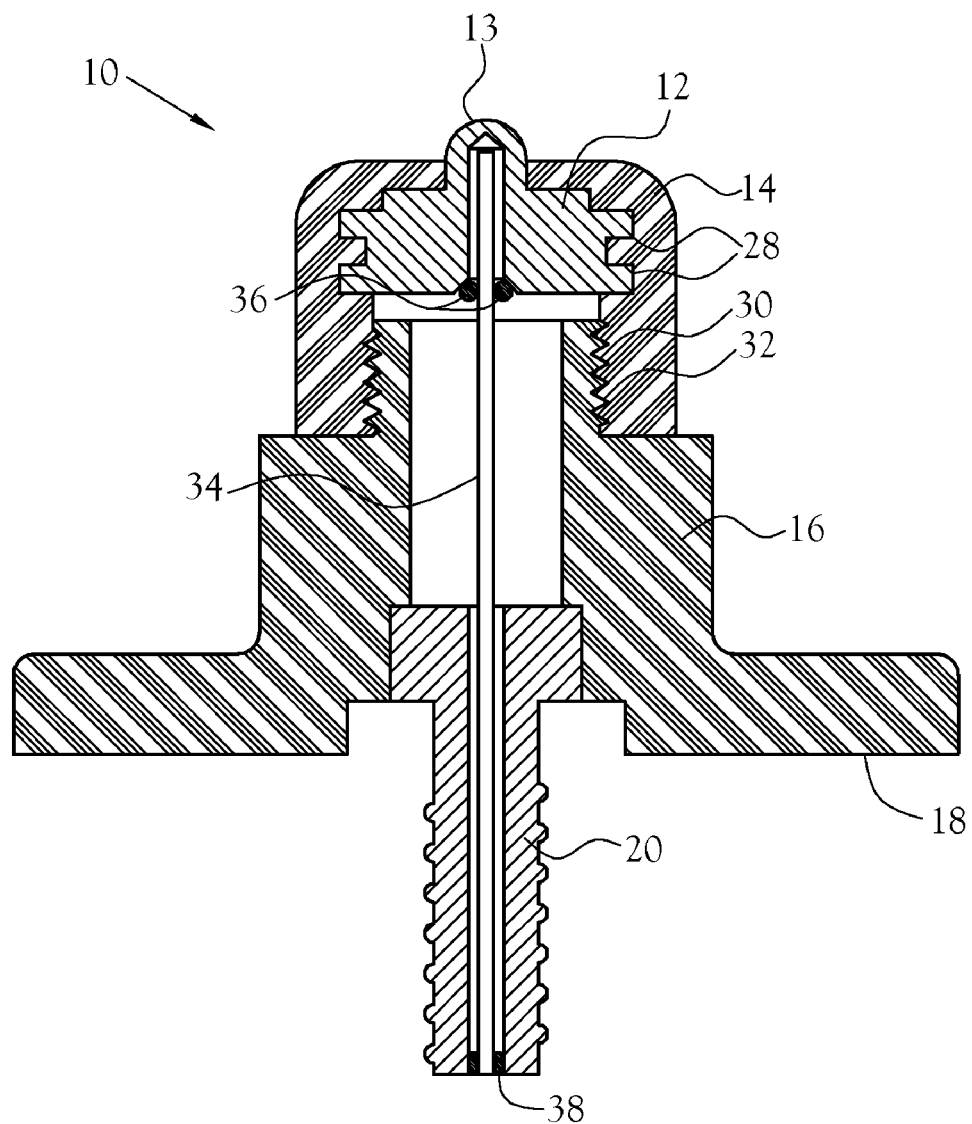
FIG. 3 is a side elevation cross section of the insulated probe device, taken at Section 3-3 of FIG. 2.

FIG. 3 is a sectional view of the insulated probe device 10, taken at 3-3 of FIG. 2, illustrating the internal configuration of the insulated prove device 10. In the illustrated embodiment, the electrode 12 includes angular projections 28 adapted to be received by channels in the first housing component 14 such that when received, the electrode 12 is secured, and essentially molded, within the first housing component 14. Those skilled in the art will recognize that the electrode 12 can be secured within the first housing component 14 by ways other than that of corresponding angular projections and channels without departing from the scope or spirit of the present invention. In the illustrated embodiment, the first housing component 14 defines a female threaded portion 30 that cooperates with a male threaded portion 32 defined by the second housing component 16 such that the first housing component 14 is secured to the second housing component 16 when the threaded portions 30 and 32 are appropriately engaged. The threaded arrangement of the female threaded portion 30 and the male threaded portion 32 includes a number of stops that allow the length of the insulated probe device 10 to be adjusted as desired by tightening and loosening the first housing component 14 with respect to the second housing component 16. Those skilled in the art will recognize that the first housing component 14 can be secured to the second housing component 16 by ways other than that of cooperating threaded portions without departing from the scope or spirit of the present invention. In the illustrated embodiment, the mounting device 20 is secured to the second housing component 16 by a welding solvent. Those skilled in the art will recognize that the mounting device 20 can be secured to the second housing component 16 by ways other than that of welding solvent without departing from the scope or spirit of the present invention.

The insulated probe device 10 includes a conductor 34, which is disposed within the through-opening that runs axially through the second housing component 16. The conductor 34 is electrically connected to the electrode 12 and the mounting device 20 such that the electrode 12 is in electrical communication with the mounting device 20. In the illustrated embodiment, the conductor 34 is electrically and mechanically secured to the electrode 12 by first solder joints 36. Additionally, the conductor 34 is electrically and mechanically secured to the mounting device 20 by second solder joints 38. Those skilled in the art will recognize that the conductor 34 can be mechanically and electrically secured to the electrode 12 and to the mounting device 20 by ways other than that of solder joints without departing from the scope or spirit of the present invention. Additionally, those skilled in the art will recognize that the conductor 34 can be mechanically secured the to electrode 12 and the mounting device 20 in a manner independent from the manner that the conductor 34 is electrically secured to the electrode 12 and the mounting device 20 without departing from the scope or spirit of the present invention. The conductor 34 is a metal-rubber substance that conducts electricity like a metal and stretches like rubber. The metal-rubber substance is produced by a process called electrostatic self-assembly. In this process, a rubber-substance is first immersed in positively charged ions. This creates a layer of positively charged ions on the rubber-substance. Next, the rubber-substance is immersed in negatively charged ions. This creates a layer of negatively charged ions on the first layer of positively charged ions. This process is repeated to produce alternating layers of positively charged ions and negatively charged ions extending from the rubber-substance. The metal-rubber substance includes a sufficient concentration of metal to conduct electricity, but a sufficiently low concentration of metal to maintain the elasticity of rubber. As a result, when the length of the insulated probe device 10 is varied, by methods previously discussed, the conductor 34 adapts accordingly, eliminating the need for space-consuming expanding conductors such as coiled wire, rigid multi-part telescoping conductors, and excess wire.

From the foregoing description, those skilled in the art will recognize that a device for delivering an electroshock stimulus to an animal for behavioral training purposes offering advantages over the prior art has been provided. The device provides an electrode that is insulated from accumulated moisture on the coat of the animal such that electrical shunting is minimized. Further, the device provides a feature that allows the ultimate axial length of the device to be adjusted without requiring multiple conductors of various lengths.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, I claim:

1. An insulated probe device for delivering an electroshock stimulus to an animal for behavioral training and/or containment purposes, said device comprising:
    a housing having a first end and a second end;
    an electrode, said electrode being electrically conductive, said electrode being disposed within the first end of said housing, said electrode defining a tip that extends from the first end of said housing;
    a mounting device, said mounting device being electrically conductive, said mounting device being secured to the second end of said housing; and
    a conductor, said conductor being a metal-rubber substance; said conductor being disposed within said housing, said conductor being in electrical communication with said electrode and said mounting device.

2. The device of claim 1 wherein the tip of said electrode is a rounded tip.

3. The device of claim 1 wherein said mounting device electrically connects said insulated probe device to an electronic animal training device.

4. The device of claim 1 wherein said mounting device mechanically secures the insulated probe device to the electronic animal training device.

5. The device of claim 3 or claim 4 wherein said mounting device is a threaded stud that cooperates with a female threaded portion of the electronic animal training device.

6. The device of claim 1 wherein said conductor is produced by electrostatic self-assembly.

7. An insulated probe device of adjustable axial length for delivering an electroshock stimulus to an animal for behavioral training and/or containment purposes and for minimizing electric shunting facilitated by moisture on the animal's coat, said device comprising:
    a housing, said housing being electrically insulating, said housing providing an adjustable axial length, said housing having a first end and a second end;
    an electrode, said electrode being electrically conductive, said electrode being disposed within the first end of said housing, said electrode defining a tip that extends from the first end of said housing;
    a mounting device, said mounting device being electrically conductive, said mounting device being secured to the second end of said housing; and
    a conductor, said conductor being a metal-rubber substance; said conductor being disposed within said housing, said conductor being in electrical communication with said electrode and said mounting device.

8. The device of claim 7 wherein the tip of said electrode is a rounded tip.

9. The device of claim 7 wherein said mounting device electrically connects said insulated probe device to an electronic animal training device.

10. The device of claim 9 wherein said mounting device is a threaded stud that cooperates with a female threaded portion of the electronic animal training device.

11. The device of claim 7 wherein said mounting device mechanically secures the insulated probe device to the electronic animal training device.

12. The device of claim 11 wherein said mounting device is a threaded stud that cooperates with a female threaded portion of the electronic animal training device.

13. The device of claim 7 wherein said conductor is produced by electrostatic self-assembly.

14. An insulated probe device of adjustable axial length for delivering an electroshock stimulus to an animal for behavioral training purposes and for minimizing electric shunting facilitated by moisture on the animal's coat, said device comprising:
    an electrode; said electrode being electrically conductive, said electrode defining a tip;
    a housing cap, said housing cap being electrically non-conductive, said housing cap including a first end and a second end, said housing cap defining a female threaded portion at the first end of said housing cap, said housing cap being adapted to house said electrode such that the tip of said electrode extends from the second end of said housing cap;
    a housing base, said housing base being electrically non-conductive, said housing base including an upper end and a lower end, said housing base defining a male threaded portion at the upper end of said housing base that cooperates with the female threaded portion defined by said housing cap such that the housing cap is tightened and loosened to secure the housing cap to the housing base and to adjust the ultimate axial length of the combined housing cap and housing base;
    a mounting device, said mounting device being electrically conductive, said mounting device being a threaded stud adapted to cooperate with a threaded portion of an electronic animal training device to mechanically secure and electrically connect said insulated probe device to the electronic animal training device, said mounting device being secured to the lower end of said housing base; and
    a conductor, said conductor being a metal-rubber substance that is electrically conductive and substantially elastic and is produced by electrostatic self-assembly, said conductor being in electrical communication with said electrode and in electrical communication with said mounting device such that said electrode and said mounting device are in electrical communication.

15. An insulated probe device of adjustable axial length for delivering an electroshock stimulus to an animal for behavioral training and/or containment purposes and for minimizing electric shunting facilitated by moisture on the animal's coat, said device comprising:
    a housing cap, said housing cap being electrically non-conductive;

an electrode, said electrode being electrically conductive, said electrode being disposed within said housing cap, said electrode extending from said housing cap;

a housing base, said housing base being electrically non-conductive, said housing base cooperating with said housing cap to provide said insulated probe device with an adjustable axial length;

a mounting device, said mounting device being electrically conductive, said mounting device being secured to said housing base; and a conductor, said conductor being electrically conductive and substantially elastic, said conductor being a metal-rubber substance created by the process of electrostatic self-assembly, said conductor being disposed within said housing base, said conductor being electrically connected to said electrode and said mounting device bringing said electrode and said mounting device into electrical communication.

* * * * *